(No Model.)

W. A. C. MATTHIE.
PIANO STOOL AND LIKE ARTICLES.

No. 320,487. Patented June 23, 1885.

Witnesses.

Inventor.

United States Patent Office.

WILLIAM A. C. MATTHIE, OF MONTREAL, QUEBEC, CANADA.

PIANO-STOOL AND LIKE ARTICLES.

SPECIFICATION forming part of Letters Patent No. 320,487, dated June 23, 1885.

Application filed January 16, 1885. (No model.) Patented in Canada January 16, 1885, No. 20,891.

*To all whom it may concern:*

Be it known that I, WILLIAM AUGUSTUS CHAPMAN MATTHIE, of the city of Montreal, in the county of Hochelaga, in the Province of Quebec, Canada, gentleman, have invented a certain new and useful Improvement in a Device for Securing in any Desired Position Piano-Stools and other Analogous Extensible Articles; and I do hereby declare that the following is a full, clear, and exact description of the same.

The invention relates to a certain improvement in a device patented by me in Canada on the 29th November, 1884, under No. 20,670, and described in an application filed at Washington on the 5th December, 1884, under Serial No. 149,549; and the object of the present invention is to simpify the device employed for securing in any desired position the spindle of a piano-stool or other analogous extensible articles; and it consists, essentially, in forming within the sleeve placed at the top of the stand to receive the spindle a pivoted section having a projection formed on it and extending into the sleeve to fit into the grooves made in the spindle, the said section being thrown into action by a spring, and provided with a handle arranged to extend to the outside of the stand, for the purpose of throwing the section out of action or connection with the spindle, substantially as hereinafter more particularly explained.

Figure 1:
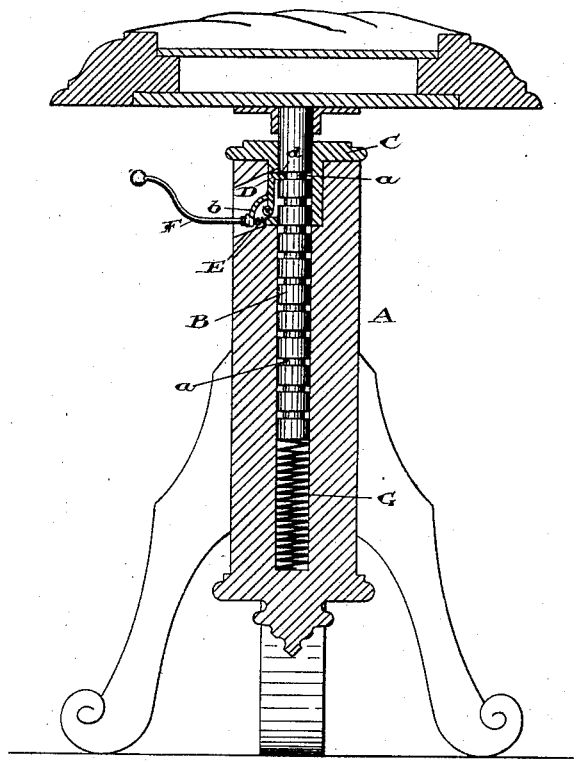
Figure 2:
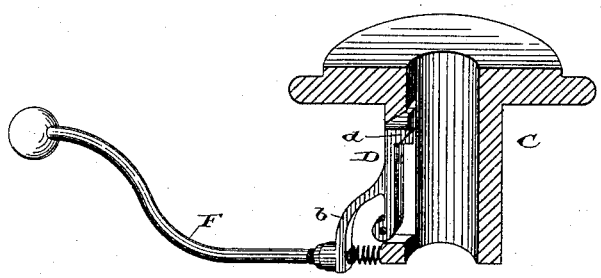

Figure 1 is a sectional elevation of an extensible piano-stool provided with my improved device. Fig. 2 is an enlarged perspective detail of the sleeve, showing its pivoted section.

In the drawings, A is the stand.

B is the spindle, having annular grooves $a$ made in it in the same manner as described in the patent and application hereinbefore referred to.

C is the sleeve, which is shaped substantially as indicated, and fits into a recess formed in the top of the stand A, through which a hole is made to receive the spindle B.

D is a dog pivoted and fitted into a recess made in the sleeve C, so that the said dog forms practically a section of the said sleeve.

A curved tail, $b$, is shaped substantially as shown, and has placed below it a spring, E, which presses against the outside of the sleeve C, and by that action throws the upper end of the dog D into the sleeve, so that the projection $d$, formed on the top end of the said dog, shall have a tendency to fall into the annular grooves $a$ as they come opposite to it.

F is a handle arranged to be screwed into the tail $b$, by pressing which handle the dog D will be tilted on its pivot, and the projection $d$, formed on its top, is thus drawn out of the groove $a$, into which it may at the time be fitting. So soon as the handle is released the spring E will of course throw the projection once more into connection with the grooves in the spindle. When the recess or hole is made in the top of the stand A to receive the sleeve C, a groove is made on one side of the said hole to allow the tail $b$ to slip down. A hole is made in the side of the stand A opposite to the point at which the tail is when the sleeve is pressed into position. This hole allows the handle F to be screwed into the tail $b$, and is also sufficiently large to allow free movement of the handle sufficiently for the purpose of throwing the dog D out of action.

While I shall generally use the spring G, the action of which is fully described in the patent and application hereinbefore referred to, I may sometimes wish to dispense with the said spring, in order to allow the spindle B to be withdrawn without pulling the dog D out of action. I sometimes bevel off the bottom side of the projection $d$, as shown in Fig. 2, which beveling off will prevent the projection $d$ from presenting any appreciable resistance to the upward movement of the spindle B, while the top side of the projection $d$ being still square, it will effectually support the spindle and prevent it moving downwardly.

As the action and operation of the device herein described is, except in the particulars mentioned, exactly the same as the device explained in the patent and application hereinbefore referred to, it is not necessary to enter into any further details.

I am aware of the Patents Nos. 230,467 and 232,790, and make no claim to the constructions shown therein as forming part of my invention.

I am aware of the patent to Tripp, No. 208,000, and make no claim to the construction shown therein as forming part of my invention.

What I claim as my invention is—

In a revolving stool or chair, the combination, with the stand A, the sleeve C, inserted in a recess in said stand, and the spindle B, working through said sleeve and in a socket in said stand, of the dog D, pivoted in a recess in said sleeve and forming a section thereof, and provided with a projection, $d$, and tail $b$, the spring E between said tail and sleeve, and the handle F, connected to said tail and working through a recess in the stand A, substantially as and for the purpose specified.

Toronto, December 23, 1884.

W. A. C. MATTHIE.

In presence of—
 CHARLES C. BALDWIN,
 F. B. FEATHERSTONHAUGH.